United States Patent [19]
Boiocchi et al.

[11] Patent Number: 5,695,578
[45] Date of Patent: Dec. 9, 1997

[54] TIRE WITH A REINFORCED BELT BAND OF ALTERNATING FIRST AND SECOND CORDS

[75] Inventors: Maurizio Boiocchi, Segrate; Gurdev Orjela, Gavirate, both of Italy

[73] Assignee: Pirelli Coordinamento Pneumatici, Milan, Italy

[21] Appl. No.: 607,630

[22] Filed: Feb. 27, 1996

[30] Foreign Application Priority Data

Feb. 27, 1995 [IT] Italy ................... MI95A0369

[51] Int. Cl.$^6$ ............... B60C 1/00; B60C 9/18; B60C 9/20
[52] U.S. Cl. ............ 152/458; 152/526; 152/527; 152/531; 152/533; 152/536; 152/537
[58] Field of Search .................... 152/536, 537, 152/527, 531, 533, 458, 526

[56] References Cited

U.S. PATENT DOCUMENTS

| | | |
|---|---|---|
| 3,570,575 | 3/1971 | Marker et al. |
| 3,772,130 | 11/1973 | Marzocchi |
| 3,919,018 | 11/1975 | Schroeder ............... 152/536 X |
| 4,073,330 | 2/1978 | Allard |
| 5,351,735 | 10/1994 | Okuda ..................... 152/536 |
| 5,404,924 | 4/1995 | Yuze ...................... 152/536 X |

FOREIGN PATENT DOCUMENTS

| | | | |
|---|---|---|---|
| 264889 | 9/1963 | Australia ............... 152/536 |
| 0320705 | 6/1989 | European Pat. Off. | |
| 0329589 | 8/1989 | European Pat. Off. | |
| 1374817 | 1/1965 | France | |
| 2263898 | 10/1975 | France | |
| 2344412 | 10/1977 | France | |
| 1937684 | 1/1970 | Germany | |
| 56-112304 | 9/1981 | Japan .................. 152/536 |
| 64-83406 | 3/1989 | Japan .................. 152/536 |
| 1204802 | 8/1989 | Japan .................. 152/536 |
| 5-96908 | 4/1993 | Japan .................. 152/536 |
| 6-55908 | 3/1994 | Japan .................. 152/536 |
| 1067755 | 5/1967 | United Kingdom | |
| 1574425 | 9/1980 | United Kingdom | |
| 2063185 | 6/1981 | United Kingdom ...... 152/536 |

OTHER PUBLICATIONS

Patent Abstracts of Japan, vol. 18, No. 398 (M–1645), 26 Jul. 1994 and JP-A-06 115307, 26 Apr. 1994 (Bridgestone Corp.).

Primary Examiner—Adrienne C. Johnstone
Attorney, Agent, or Firm—Watson Cole Stevens Davis, P.L.L.C.

[57] ABSTRACT

A pneumatic tire particularly adapted for cars, is provided with belt strips (7, 8) each comprising a first and a second series of cords (7a, 7b, 8a, 8b) made of different materials, alternated with each other axially across the width of the tire according to a preestablished sequence. The cords (7b, 8b) of the second series, made of aramid or glass for example, cooperate with those of the first series (7a, 8a), made of steel, to withstand tensile stresses in the longitudinal direction. Conversely, the cords (7b, 8b) of aramid or glass have a greater compliance than the steel cords (7a, 8a) towards compressive stresses. The elastomer incorporating the cords (7a, 7b, 8a, 8b) is filled with reinforcing fibers, short aramid fibers or aramid pulp for example, and has a modulus of elasticity between 15 and 50 megapascals.

21 Claims, 2 Drawing Sheets

TIRE WITH A REINFORCED BELT BAND OF ALTERNATING FIRST AND SECOND CORDS

BACKGROUND OF THE INVENTION

The present invention relates to a tire having a reinforced belt band, of the type comprising: a carcass ply having opposite circumferential edges turned up about corresponding bead cores, each arranged close to a radial inner edge of the tire. At least one belt strip is circumferentially wrapped about the carcass ply and comprising a layer of elastomeric material incorporating a first series of reinforcing cords and a second series of reinforcing cords alternated with the cords of the first series according to a predetermined sequence. The cords of at least one of said first and second series have a capability for tensile strain greater than their capability for compressive strain. A tread band is circumferentially positioned radially outward of said belt strip.

In particular, the present tire is intended for use on high-performance cars; in addition the improvement disclosed herein can be employed to advantage to make tires having a low resistance to rolling for example, and/or tires of various other types.

It is known that modern tires for motor-vehicles essentially comprise a carcass of the radial type, formed of at least one ply, the opposite side edges of which are turned up around corresponding bead cores incorporated in the elastomeric material arranged close to the tire beads.

A belt reinforcement or belt band is circumferentially applied radially outward of the carcass ply, and it usually consists of one or more mutually superposed belt strips, each of which is formed of a series of cords disposed in parallel side by side relation. These cords are incorporated in a layer of elastomeric material and oriented according to a predetermined angle to the direction of the mid-circumferential plane of the tire.

A tread band for contacting the roadbed is circumferentially applied to the belt reinforcement.

In pneumatic tires it is known that in order to ensure the geometrical stability and structural resistance of the tire, the belt reinforcement must be capable of withstanding high tensile stresses in the radial outward direction which are generated both by effect of the inflation pressure of the tire and, above all, by effect of the centrifugal forces created when the vehicle is running at high speed.

Based on the above knowledge, the use of belt reinforcements has become quite common, especially in the manufacture of tires for high-performance cars, in which a first strip having steel cords is superposed with a second strip the cords of which are made of a textile material such as aramid. Due to the presence of the aramid strip, the belt band has excellent features of tensile stress and flexibility, while at the same time it has an advantageously reduced weight, which is fundamental for reducing the centrifugal forces when running at high-speeds is involved.

In an attempt to eliminate all problems found in tires having belt bands made following the above specifications, which show an asymmetric behavior in connection with slip thrusts and steering angles, as well as problems of dimensional stability during the manufacturing process, belt bands have been also proposed in which the strips are reinforced with cords of the so-called "hybrid" type, that is each consisting of metal wires and textile yarns suitably twisted together. However such belts involve important complications in the manufacturing processes, in that textile yarns and metal wires are to be handled simultaneously.

The use of belt bands in which each belt strip comprises metallic cords and textile cords disposed in parallel, and alternated with each other following predetermined sequences has been also suggested.

This solution is described in U.S. Pat. No. 4,073,330 in which it is pointed out that the textile cords can consist of nylon, aramid or glass fibers, having a modulus of elongation under pulling stresses in the order of at least 35 GPa (GigaPascal) and in any case of a magnitude comparable with that of metallic cords.

It should be also noted that in order to improve the behavior of such tires, especially with reference to the capability of reacting to slip thrusts and the resistance to fatigue, consideration has been given to making some tire components using blends containing reinforcing fiber fillers distributed at random or oriented according to a preferred direction. In this connection, U.S. Pat. No. 4,871,004 discloses different tire components made with the use of blends filled with reinforcing fibers.

This solution enables the modulus of elasticity of the blend thus filled to be increased until values in the order of 50 MPa (Megapascal), thereby greatly improving the resistance to fatigue of the material which is rather low in blends having a high modulus of elasticity when obtained by adopting methods different from the introduction of fiber fillers.

Important results have been thus achieved in terms of improving the behavior of such tires and the resistance to fatigue of the components. In some cases, as disclosed for example in U.S. Pat. No. 4,949,770, the fiber fillers made of aramid and suitably oriented, have proved to be capable of replacing the cords usually arranged in the belt strips.

Positive results have been also achieved through the use of the fiber reinforcing fillers in belt strips provided either with metallic or textile cords, all of the same material.

SUMMARY OF THE INVENTION

In accordance with the present invention, it has been found that by the use of a blend filled with aramid fibers or equivalent means in combination with a first and a second series of sequentially alternated metallic and textile cords, in making belt strips, it is possible to achieve, in addition to an improvement in the operating behavior of the tire as a whole, the surprising elimination of risks of breakage of the metallic cords under the effect of buckling loads induced by compressive stresses.

Accordingly, in one aspect, the present invention relates to a tire having a reinforced belt band, in which the elastomeric material of said band is filled with fibrous reinforcement means to give the elastomeric material a modulus of elasticity of between 15 and 50 MPa.

In more detail, the fibrous reinforcement means preferably consists of short fibrilliform aramid fibers, incorporated in the elastomeric material in an amount between 1 and 10 phr (parts by weight per one hundred parts of rubber) and distributed according to an orientation at random, or oriented according to a preferred direction forming an angle of a value included between 0° and 90° to the longitudinal path of the cords, so as to give the belt strip a desired ratio value between the moduli of elasticity in the direction of the longitudinal path of the cords and in a direction perpendicular thereto, respectively.

It is also provided that the elastomeric material, filled with fibrous reinforcement, should have a coefficient of hysteresis loss between 0.06 and 0.2.

Advantageously, the elastomeric material contains sulphur in an amount between 2 and 6 phr, a bonding resin preferably consisting of resorcinol in an amount between 0.5 and 3 phr, and methylene donor additives preferably comprising hexamethylene tetramine in an amount between 1 and 8 phr.

In a second aspect, the invention relates to a tire provided with a belt reinforcement made of fabric strips each comprising a first and a second series of cords formed of different materials, alternated with each other following a predetermined sequence, of which the cords of the second series withstand at least 20% of the tensile loads applied to the corresponding belt strip, in parallel to the longitudinal path of the cords themselves.

The ratio between the modulus of elongation under tension of the cords of the second series is at least equal to 50% of that of the cords of the first series.

In a preferred embodiment the cords of the first series are made of steel, the cords of the second series are made of aramid, with a dTex of between 1000 and 4000, or of glass fibers, with a dTex of between 1000 and 5000.

Advantageously, each cord of the second series is disposed intermediate two cords of the first series and in any case the ratio between the amount of cords of said first and second series respectively is between 20% and 80%. The cords of the first series are made of metal wires of a diameter between 0.10 and 0.40 mm, twisted together according to different configurations, 1×3, 1×4, 2+2, 2+7; for example: this means that the cords can advantageously be made of two strands twisted together, each consisting of two elementary wires (2+2), or a single strand of four elementary wires (1×4), or a core strand of two wires around which seven elementary wires are crown-wound (2+7).

Conveniently, the cords of the second series are of a diameter close to 20% of the diameter of the cords of the first series.

Said cords are also distributed according to a thickness of between 50 and 150 per decimeter (dm), occupying a volume of between 20% and 80% of the overall volume of the corresponding belt strip.

In a preferred embodiment, a first belt strip circumferentially positioned around the carcass ply is provided, along with a second belt strip circumferentially positioned around the first belt strip, each of said belt strips comprising a first and a second series of reinforcing cords.

Advantageously, the first belt strip projects symmetrically axially outward from the opposite side edges of the second belt strip, by an amount between 5 mm and 10 mm.

In addition the cords of the first and second belt strips respectively are symmetrically inclined in opposite directions to the circumferential direction of the tire, according to an angle included between 15° and 45°.

Preferably the tire according to the present invention further comprises at least one auxiliary belt strip circumferentially wrapped about the second belt strip and comprising cords of heat-shrinkable material disposed according to an inclination of between 0° and 10° to the mid-circumferential plane (equatorial plane) of the tire.

In a first embodiment, this at least one auxiliary belt strip extends over the whole axial width of the belt strips, symmetrically projecting from the opposite axial side edges of the first belt strip by an amount between 5 mm and 10 mm.

In a second embodiment, this at least one auxiliary belt strip comprises at least two ribbon-like portions each axially overlapping corresponding side edges of the first and second belt strips, each of said ribbon-like portions projecting axially from the edge of the first belt strip by an amount between 5 and 10 mm, and axially overlapping the second belt strip by an amount in the order of 20% of the width of this second strip.

BRIEF DESCRIPTION OF THE DRAWINGS

Further features and advantages will become more apparent from the detailed description of a preferred embodiment of a tire having a belt reinforcement according to the present invention. This description will be given hereinafter by way of non-limiting example, with reference to the accompanying drawings, in which.

DESCRIPTION OF THE PREFERRED EMBODIMENTS

Figure 1:
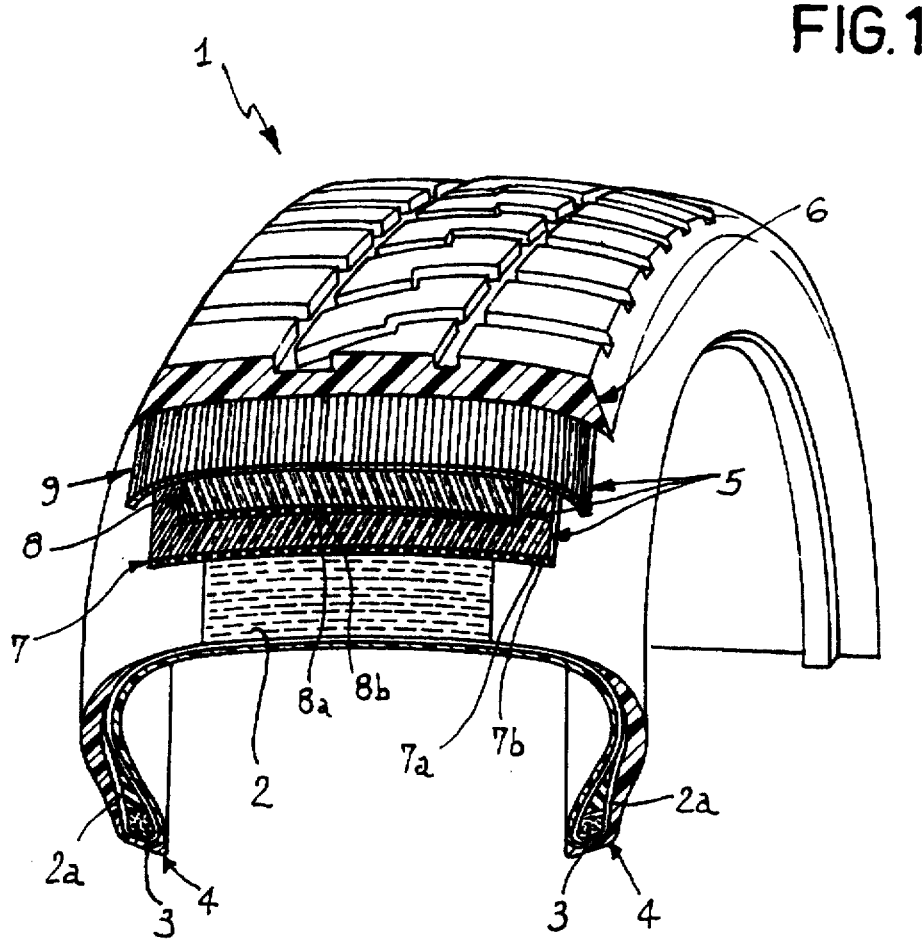
FIG. 1 is a diagrammatic perspective view partly in section of a tire according to the present invention.

With reference to the drawings, a tire having a reinforced belt band according to the invention has been generally identified by reference numeral 1.

Tire 1 comprises at least one carcass ply 2 of the radial type, that is comprised of a plurality of cords incorporated in an elastomeric layer in mutual side by side relationship and each substantially lying in a respective plane radial to the rotation axis of the tire. The carcass ply 2 has its end edges 2a turned up axially outwardly about a pair of bead cores 3, incorporated into corresponding beads 4 defining the inner circumferential edges of the tire.

Circumferentially wrapped about the carcass ply 2 is a belt band or belt reinforcement 5, which is in turn confined by a tread band 6 through which contact of the tire with the ground occurs.

The belt band 5, the function of which is to give the tire the necessary geometrical stability and structural strength, comprises one or more belt strips 7, 8 each essentially formed of a plurality of cords 7a, 7b, 8a, 8b disposed in parallel side by side relation and incorporated in an elastomer layer not discernible from the accompanying drawings.

In more detail, in a preferred embodiment of the tire of the invention, the presence of a first belt strip 7 and a second belt strip 8 is provided, which strips are disposed in mutual superposition relationship and have the respective cords 7a, 7b, 8a, 8b oriented in directions symmetrically inclined to the circumferential direction of the tire.

According to the present invention, the angle α formed by each of the cords 7a, 7b, 8a, 8b with respect to the mid-circumferential plane of the tire is between 15° and 45°, preferably between 18° and 25°.

Figure 2:
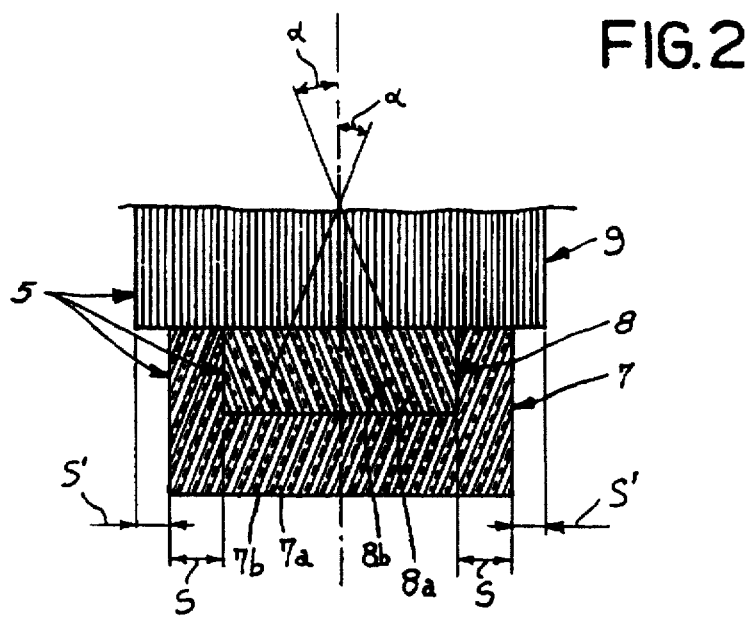
FIG. 2 is a diagrammatic plan view of the mutual arrangement of the components forming the belt reinforcement provided in the tire of FIG. 1.

In addition the first belt strip 7 which is disposed directly in contact with the carcass ply 2, should symmetrically project from the axial opposite side edges of the second belt strip 8, by an amount "S" (see FIG. 2) of between 5 and 10 mm.

Still in accordance with a preferred embodiment of the invention, the belt band further comprises at least one auxiliary belt strip 9 comprising cords of heat-shrinkable material such as nylon for example, disposed at an inclination of between 0° and 10° to the circumferential direction of the tire 1.

In the embodiment shown in FIG. 1, this auxiliary belt strip 9 extends over the whole axial width of the underlying belt strips 7, 8 and symmetrically projects from the axial opposite side edges of the first belt strip 7, preferably by an amount "S'" of between 5 and 10 mm.

Figure 3:
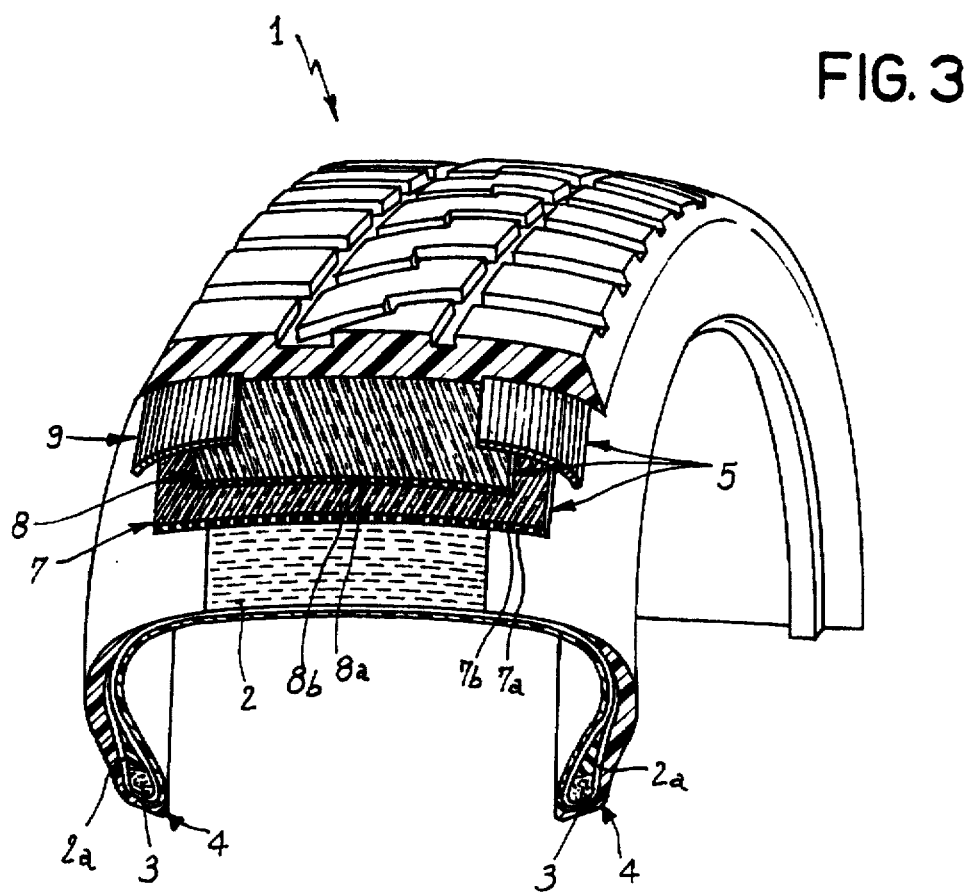
FIG. 3 is a perspective view partly in section of another embodiment of the tire of the present invention.
Figure 4:
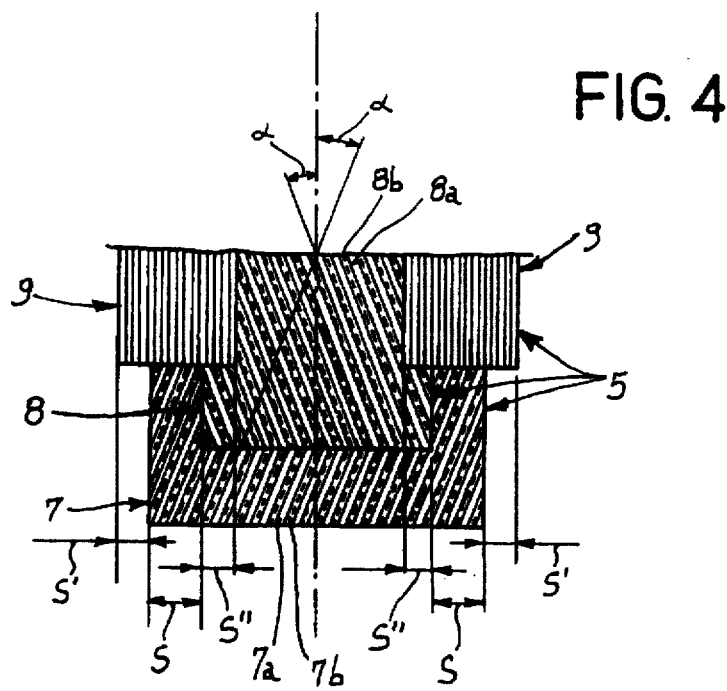
FIG. 4 is a diagrammatic plan view showing the mutual arrangement of the components of the belt reinforcement provided in the tire of FIG. 3.

In the embodiment shown in FIG. 3, the auxiliary belt strip 9 consists of two ribbon-like portions, each axially overlapping corresponding side edges of the first and second belt strips 7, 8. As clearly shown in FIG. 3, each ribbon-like portion of the auxiliary belt strip 9 axially projects from the edge of the first belt strip 7 by an amount "S'" of between 5 and 10 mm, and axially overlaps the second belt strip 8 by an amount "S''" of between 10% and 30% of the axial width of said second strip 8.

Both the strip 9 and the two ribbon-like portions forming the strip can be conveniently made by helically wrapping an individual cord or a tape comprising a plurality of cords (preferably 3 to 5 cords) of said heat-shrinkable material on the underlying strips 7 and 8 with a plurality of coils axially disposed side by side.

Advantageously, the cords 7a, 7b, 8a, 8b arranged in each of the belt strips 7, 8 are at least of two different types. More particularly, it is provided that in the elastomeric material layer forming each of the belt strips 7, 8, a first series of tough cords 7a, 8a and a second series of tough cords 7b, 8b should be incorporated, the second series being made of a material different from that of the cords of the first series, and being alternated with the latter following a preestablished sequence. In addition the cords 7a, 8a belonging to one of said first and second series have a resistance for tensile strain greater than their resistance for compressive strain. In a preferred embodiment the cords 7a, 8a of the first series are made of steel and the cords 7b, 8b of the second series, alternated with those of the first series, are made of a textile fiber of high modulus, preferably of aramid or glass fiber.

The steel cords 7a, 8a belonging to the first series perform the dual function of withstanding the tensile forces induced in the belt band 5 by the effect of inflation pressure of the tire and the centrifugal forces generated by the tire rotation, and of conveniently counteracting the compressive forces induced by effect of the vertical loads applied to the wheel on which the tire is mounted. The cords 7b, 8b belonging to the second series, in turn, cooperate with the cords of the first series in terms of resistance to the tensile forces, but they do not offer any important resistance to the compressive stresses.

Thus an excellent structural strength is imparted to the belt band 5 and the tire 1 as a whole, above all with reference to the centrifugal stresses resulting from high-speed running, the ride comfort of the tire being also improved and its weight reduced.

In the above described embodiments, the best results are found to be achieved through the use, with reference to the first series, of cords 7a, 8a made of elementary wires of a diameter between 0.10 and 0.40 mm, according to configurations formed of strands twisted together. For example, in the configuration 2+2 the two strands are each formed of two elementary wires, in the configuration 2+7, seven additional wires are wrapped about a core strand made of two wires; in any case a person skilled in the field will be able to readily choose, case by case, the most appropriate conformation for said cords of the first series, according to the specific requirements. One embodiment of cords 7a, 8a is two strands twisted together, each strand consisting of four elementary wires.

The cords 7b, 8b belonging to the second series, in turn, have a dTex of between 1000 and 4000 if they are made of aramid and between 1000 and 5000 in the case of a glass fiber, and the ratio of their diameter to that of the metallic cords (7a, 8a) is between 0.8 and 1.2.

The values of the ratio between the diameters and the moduli of elasticity of the cords 7a, 8a, 7b, 8b are decisive for achieving an optimal load distribution between the two cord types, in order that the metallic cords 7a, 8a shall not be fatigued too much as compared with the textile cords 7b, 8b or vice-versa. In fact, the necessary condition for the achievement of a good operation of the belt strips 7, 8 is that all cords 7a, 8a, 7b, 8b should substantially have the same behavior to tensile. In this connection, also the alternating sequence of the cords may vary within wide limits; while sequence 1:1 is the preferred one, the ratio between the textile amount and the metal amount in the belt strip is conveniently between 0.20 and 0.80.

In addition, a studied selection of the diameters and the moduli of elasticity of the textile and metallic cords facilitates the production process for the manufacture of the belt strips and ensures a good penetration of the elastomeric material between the individual strips and a good overall rubberizing of the semifinished product, along with an excellent evenness in the distribution of the cords in the cross section of the respective belt strip 7, 8.

It should be also noted that the optimization of said parameters allows an advantageous limitation in the belt strip thickness, with reference to the diameter of the metallic cords 7a, 8a, so as to simultaneously give the belt band a fair bending rigidity, which improves the ride comfort, and a high shearing rigidity which improves the tire behavior on the road, referring particularly to any slip thrusts.

In addition, it is also preferably provided that the cords 7a, 7b, 8a, 8b belonging to the first and second series should be distributed according to a thickness or density of between 50 and 150 per decimeter, so that, in the respective belt strips 7, 8, they occupy a volume between 20% and 80% of the overall volume of said belt strips.

Obviously, the materials used for making the cords and the construction features thereof can vary depending on requirements and the specific use intended for the tire.

For example, as previously stated, the cords 7b, 8b of the second series combined with the steel cords 7a, 8a of the first series may consist of glass fibers and have a dTex included between 1000 and 5000, for example.

Alternatively, the cords 7a, 8a belonging to the first series may be made of aramid and the cords 7b, 8b of the second series may be made of glass fiber.

In principle it is however desirable that the selection of the materials and the dimensional construction features of the individual cords 7a, 7b, 8a, 8b should take place in such a manner that, under an imposed elongation, the less stressed cords, those belonging to the second series for example, shall withstand at least 20% of the tensile load applied to the corresponding belt strip, parallel to the longitudinal extension of the cords.

In addition and advantageously, the modulus of elongation under tension of the cords of the second series should be at least equal to 50% of the modulus of elongation under tension of the cords of the first series.

In accordance with the invention, the Applicants had sensed by intuition and then verified that, in the presence of the textile cords 7b, 8b having a low resistance to compression, the metallic cords 7a, 8a of each belt strip 7, 8, being greatly thinned out relative to the traditional belt strips made of exclusive metallic cords, feel the effects of any buckling loads due to compressive stresses in a particularly emphasized manner. In fact, while in traditional belt strips wherein metallic cords disposed consecutively in side by side relation cooperate with each other to ensure a mutual structural stabilization, in the tire of the present invention the reduced consistency caused by the presence of the textile cords 7b, 8b which have an important strength only in connection with tensile stresses, appears to be inappropriate to carry out an efficient confining or holding of the metallic cords 7a, 8a.

The above is confirmed by the fact that tires made according to the previously described known art, in addition to several behavior problems resulting from insufficient ride comfort, a low direction stability and an insufficient slip thrust, also reveal many fatigue problems shown by the separation of the elastomeric material from the reinforcing cords of the belt strips, along with problems connected with duration, due to early breaking of said reinforcing cords.

The Applicant has therefore assumed that the real cause of the above mentioned problems relating to fatigue and early breakage was breaking of the metallic cords, since these cords greatly felt the buckling loads weighing on them, due to their becoming less thick in the strips. As a consequence, the structural yielding of the metallic cords also caused damaging and breaking of the textile cords, thereby concealing the true cause of the damages found in the known tires submitted to the test conditions and in use.

According to the invention, the Applicanta have considered filling the elastomer incorporating the cords 7a, 8a, 7b, 8b with fibrous reinforcement, capable of giving the elastomeric material a modulus of elasticity of between 15 and 50 MPa, and have found that in this manner an efficient structural stabilization of the metallic cords 7a, 8a is surprisingly achieved, which result seemed inconceivable prior thereto because the modulus of these cords, in the order of 200 GPa as known, is very much higher than the modulus that can be given to the elastomeric material with a reinforcing fibrous filling.

In accordance with the present invention, this fibrous reinforcement comprises, preferably consists of, reinforcing aramid fibers, and more preferably of short fibrilliform aramid fibers, available on the market under the name of "aramid pulp", better known as KEVLAR-Pulp or TWARON-Pulp (wherein KEVLAR is a registered trademark of Du Pont and TWARON is a registered trademark of Akzo), incorporated in the blend by an amount between 1 and 10 phr (parts per 100 parts of rubber).

These fibers advantageously give the elastomeric material a coefficient of hysteresis loss, technically identified as "tan δ", of between 0.06 and 0.2.

Depending on requirements, the reinforcing fibers may be distributed in the blend according to an orientation at random or may take a preferred orientation, at an angle of between 0° and 90° with respect to the longitudinal extension of the cords 7a, 8a, 7b, 8b, following plastic stretching processes for example carried out on the blend during production thereof. The choice of the value of this angle affects the value of the ratio between the moduli of elasticity detectable in each of the belt strips 7, 8, in the direction of the longitudinal extension of the cords and in a direction at right angles thereto, respectively. It is therefore possible to impart appropriate behavior features to the tire by suitably selecting the orientation of the reinforcing fibres to the cords 7a, 8a, 7b, 8b.

It is also provided that the elastomeric material of the individual belt strips 7, 8 should contain sulphur in an amount between 2 and 6 phr. The high sulphur content is important to ensure a good bonding of the blend to the metallic cords, especially if brass-coated.

However, the presence of sulphur adversely affects the bonding features of the elastomer to the textile cords. In order to solve this problem, the elastomeric material shall also contain an appropriate bonding resin and appropriate additives, known per se, such as methylene donors.

In a preferred solution, the bonding resin consists of resorcinol in an amount between 0.5 and 3 phr, preferably in the order of 1 phr, whereas the methylene donor additives comprise hexamethylene tetramine in an amount between 1 and 8 phr, preferably in the order of 1.4 phr.

Advantageously, assembling in mutual side by side relation of the cords 7a, 8a, 7b, 8b belonging to the individual belt strips 7, 8 takes place by known calendering processes which have the advantage of avoiding the use of weft threads in order to obtain the mutual stabilization of the cords, since each of such weft threads, when a tire is finished, would represent an undesired preferential route of humidity propagation within the belt band and consequently a potential risk of corrosion setting off in the metallic cords 7a, 8a.

As an example of the construction features of the belt band of a tire made in accordance with the present invention, size 195/65 R15, are diagrammatically listed here below. With reference to FIG. 1:

- the belt reinforcement 5 has two belt strips 7, 8 each with a thickness of 1.15 mm;
- each belt strip 7, 8 has the metallic cords 7a, 8a each inserted between two textile cords 7b, 8b, and vice-versa;
- the cords 7a, 8a, 7b, 8b, of the individual belt strips 7, 8 have symmetrically crossed orientations, forming angles "α" of 23° with respect to the equatorial (mid-circumferential) plane of the tire;
- the textile cords 7b, 8b, are of aramid and have a dTex of 1670/2;
- each of the metallic cords (2×4) 7a, 8a is formed of two strands each consisting of four elementary wires with a diameter of 0.22 mm.
- the density of the cords in the elastomeric material of each belt strip (7, 8) is 98 cords per decimeter, fairly distributed between textile cords 7b, 8b and metallic cords 7a, 8a;
- the elastomeric material contains a bonding resin consisting of resorcinol and has a modulus of elasticity of 26 with a "tan δ" of 0.12.

It is pointed out that the invention achieves unexpected advantages over the known art.

It should be noted in fact that the selective behavior towards tensile and compressive stresses imparted to the belt strips 7, 8 according to the invention, produces an important improvement in the operating behavior, especially with reference to tires intended for high-performance cars.

In this connection it will be recognized that in traditional tires envisaged for this type of use, the necessity of withstanding very high centrifugal forces involves an over sizing of the tire structure, which results in too great a stiffness of the tire in relation to compressive stresses.

This situation causes an excessive restriction of the ground-contacting area of the tire giving rise to problems of ride stability at high speeds.

In the tire of the invention, on the contrary, the stiffness reduction under compression achieved through the insertion of the textile cords 7b, 8b enables also the tires particularly designed for sports vehicles to have an appropriate ground-contacting area, which involves advantages in terms of ride stability, safety, and of comfort.

In addition, the metallic and textile cords are fairly distributed between the two belt strips and oriented according to symmetrically opposite directions, so that any operating asymmetry in connection with slip thrusts and/or steering angles is eliminated. The individual textile cords, being confined between the adjacent metallic cords, are suitably protected against all risks of anomalous deformation by effect of the compressive stresses induced both during tire use and during the production of same, due for example to the shrinkage to which the heat-shrinkable belt strips are submitted during the vulcanization step.

The metallic cords, in turn, are efficiently protected against risks of deformations and/or bending under the effect of buckling loads during tire use, by virtue of the presence of the reinforcing fibers dispersed in the elastomeric material forming the belt strips. Practically, the aramid fibers incorporated in the elastomer surrounding the metallic cords 7a, 8a appear to constitute a sort of protective sheath or holding jacket for the cords themselves, capable of reducing sensitivity to bending and compression stresses and enabling them to work also under buckling load without yielding.

Obviously, modifications and variations may be made to the invention as conceived, all of them falling within the scope of the inventive idea characterizing it.

We claim:

1. A tire having a reinforced belt, said tire comprising:
   at least one carcass ply having opposite circumferential edges turned up about corresponding bead cores, each arranged close to a radially inner portion of the tire;
   at least one belt strip circumferentially positioned about the at least one carcass ply and comprising a layer of elastomeric material incorporating a first series of tough cords and a second series of tough cords alternated with the cords of the first series according to a predetermined sequence, the cords of at least one of said first and second series having a resistance to tensile strain greater than their resistance to compressive strain;
   a tread band circumferentially positioned radially outward from said at least one belt strip;
   said layer of elastomeric material being filled with fibrous reinforcement to give the elastomeric material a modulus of elasticity of between 15 and 50 MPa.

2. A tire according to claim 1, in which said fibrous reinforcement comprises reinforcing aramid fibers.

3. A tire according to claim 2 in which said reinforcing fibers are incorporated in the elastomeric material in an amount between 1 and 10 parts by weight per 100 parts of rubber.

4. A tire according to claim 1, in which said reinforcing fibers are oriented according to a preferred direction forming an angle of between 0° and 90° to a longitudinal path of the cords, so as to give said at least one belt strip a desired ratio value between the moduli of elasticity in a direction of said longitudinal path of the cords and in a direction perpendicular thereto.

5. A tire according to claim 1 in which said elastomeric material filled with fibrous reinforcement has a coefficient of hysteresis loss of between 0.06 and 0.2.

6. A tire according to claim 1 in which said elastomeric material contains sulphur in an amount between 2 and 6 parts by weight per 100 parts of rubber.

7. A tire according to claim 1 in which said elastomeric material contains a bonding resin in an amount between 0.5 and 3 parts by weight per 100 parts of rubber.

8. A tire according to claim 1 in which said elastomeric material comprises a methylene donor in an amount between 1 and 8 parts by weight per 100 parts of rubber.

9. A tire according to claim 1 wherein said at least one belt strip comprises a first belt strip positioned circumferentially about the at least one carcass ply and a second belt strip positioned circumferentially about the first belt strip, the first series and the second series of cords in each of said belt strips being of different materials.

10. A tire according to claim 9 in which the cords of the first series are made of steel and the cords of the second series are made of aramid.

11. A tire according to claim 10 in which the cords of the second series have a dTex of between 1000 and 4000.

12. A tire according to claim 10 in which each cord of the second series is disposed intermediate two cords of the first series.

13. A tire according to claim 10 in which each cord of the first series is made of two strands twisted together, each strand consisting of four elementary wires.

14. A tire according to claim 9 in which the cords of the first and second series are distributed according to a density of between 50 and 150 per decimeter.

15. A tire according to claim 9 in which the cords of the first and second series occupy a volume between 20% and 80% of the overall volume of the corresponding belt strip.

16. A tire according to claim 9 further comprising at least one auxiliary belt strip circumferentially positioned about the second belt strip and comprising cords of heat-shrinkable material disposed at an inclination of between 0° and 10° to a mid-circumferential plane of the tire.

17. A tire according to claim 16 in which each said at least one auxiliary belt strip comprises at least two ribbon-like portions each overlapping corresponding axial side edges of the first and second belt strips, each of said ribbon-like portions axially overlapping the second belt strip by an amount between 10% and 30% of the axial width of said second strip.

18. A tire according to claim 9 in which a modulus of elongation under tension of the cords of the second series is at least equal to 50% of a modulus of elongation under tension of the cords of the first series.

19. A tire according to claim 9 in which the ratio between the cord quantities of said first and second series respectively is between 0.2 and 0.8.

20. A tire according to claim 9 in which the cords of the first series are made of steel and the cords of the second series are made of glass fiber.

21. A pneumatic tire having a reinforced belt, said tire comprising:
    a pair of bead cores having a tire carcass supported thereon to form a toroidal body with the radially inner ends of each carcass ply turned up around said bead cores;
    at least one belt strip circumferentially positioned on the radially outer surface of said toroidal body, said at least one belt strip comprising a layer of elastomeric material incorporating a plurality of parallel tough cords and extending generally circumferentially around said toroidal body, a first series of said cords alternating according to a predetermined sequence with a second series of said cords of a different material;

the first series of cords being steel cords having a resistance to tensile strain greater than resistance to compressive strain;

the second series of cords being aramid or glass fiber cords having resistance to tensile forces;

an elastomeric tread band circumferentially positioned radially outward from said at least one belt strip;

said layer of elastomeric material including fibrous reinforcement, and sulphur for bonding with said steel cords and a resin for bonding with said aramid or glass fiber cords.

* * * * *